United States Patent [19]

Sakanushi

[11] Patent Number: 5,249,194
[45] Date of Patent: Sep. 28, 1993

[54] LASER DIODE PROTECTIVE CIRCUIT FOR AN OPTICAL TRANSMISSION APPARATUS

[75] Inventor: Yoshiaki Sakanushi, Kanagawa, Japan

[73] Assignee: Sumitomo Electric Industries, Ltd., Osaka, Japan

[21] Appl. No.: 834,810

[22] Filed: Feb. 13, 1992

[30] Foreign Application Priority Data

Mar. 14, 1991 [JP] Japan .................... 3-049626

[51] Int. Cl.$^5$ .............................. H01S 3/00
[52] U.S. Cl. ........................ 372/38; 372/33; 372/29
[58] Field of Search .................... 372/38, 33, 29

[56] References Cited

U.S. PATENT DOCUMENTS

| | | |
|---|---|---|
| 4,789,987 | 12/1988 | Fraser . |
| 4,872,173 | 10/1989 | Richardson . |
| 4,924,473 | 5/1990 | Burgyan et al. ............... 372/38 |
| 5,134,624 | 7/1992 | Ono ............................. 372/33 |
| 5,140,603 | 8/1992 | Anderson, Jr. et al. ........ 372/38 |

FOREIGN PATENT DOCUMENTS 1236514 5/1988 Canada .
57-121340 7/1982 Japan .
61-16637 1/1986 Japan .

*Primary Examiner*—Léon Scott, Jr.
*Attorney, Agent, or Firm*—Cushman, Darby & Cushman

[57] ABSTRACT

A laser diode protective circuit for an optical transmission apparatus having a laser diode for converting an information signal into a luminous signal to be output. The laser diode protective circuit includes at least two of the following three circuits: a filter circuit, provided at a preceding stage of the laser diode, for permitting passage of only a predetermined frequency band of the information signal; a detection/interruption circuit for detecting when a signal having a level higher than a predetermined level is supplied to the laser diode, and for temporarily interrupting the signal to be supplied to the laser diode; and a control circuit for controlling an electric power for use in driving the laser diode. A noise component to be introduced into the laser diode contained in the optical transmission apparatus is limited by the filter circuit in terms of frequency, the detection/interruption circuit in terms of time, and the control circuit in terms of electric power, so as to protect the laser diode.

9 Claims, 1 Drawing Sheet

LASER DIODE PROTECTIVE CIRCUIT FOR AN OPTICAL TRANSMISSION APPARATUS

BACKGROUND OF THE INVENTION

1. Field of the Invention

The present invention relates to a laser diode protective circuit for an optical transmission apparatus.

2. Description of the Related Art

Conventionally, an optical transmission apparatus for converting an electric signal into a luminous signal to be output has been used in an optical cable television (CATV) system.

However, such an optical transmission apparatus has been basically intended to be used indoors, and this fact has rendered unsatisfactory the protection of a laser diode contained in the optical transmission apparatus with respect to outdoor use. Namely, in the case where the conventional optical transmission apparatus is used outdoors, so-called surge tends to be caused on the electric signal line due to thunderbolt or the like, so that the laser diode of the optical transmission apparatus may be broken.

SUMMARY OF THE INVENTION

An object of the present invention is to provide a protective circuit capable of satisfactorily protecting a laser diode under severe conditions in outdoor use or the like.

A laser diode protective circuit for an optical transmission apparatus according to the present invention has a laser diode for converting an information signal into a luminous signal to be output. The laser diode protective circuit comprises at least two of the following three means: filter means, provided at a preceding stage of the laser diode, for permitting passage of only a predetermined frequency band of the information signal; detection/interruption means for detecting when a signal having a level higher than a predetermined level is supplied to the laser diode, and for temporarily interrupting the signal to be supplied to the laser diode; and control means for controlling an electric power for use in driving the laser diode.

DETAILED DESCRIPTION OF THE PREFERRED EMBODIMENT

Figure 1:
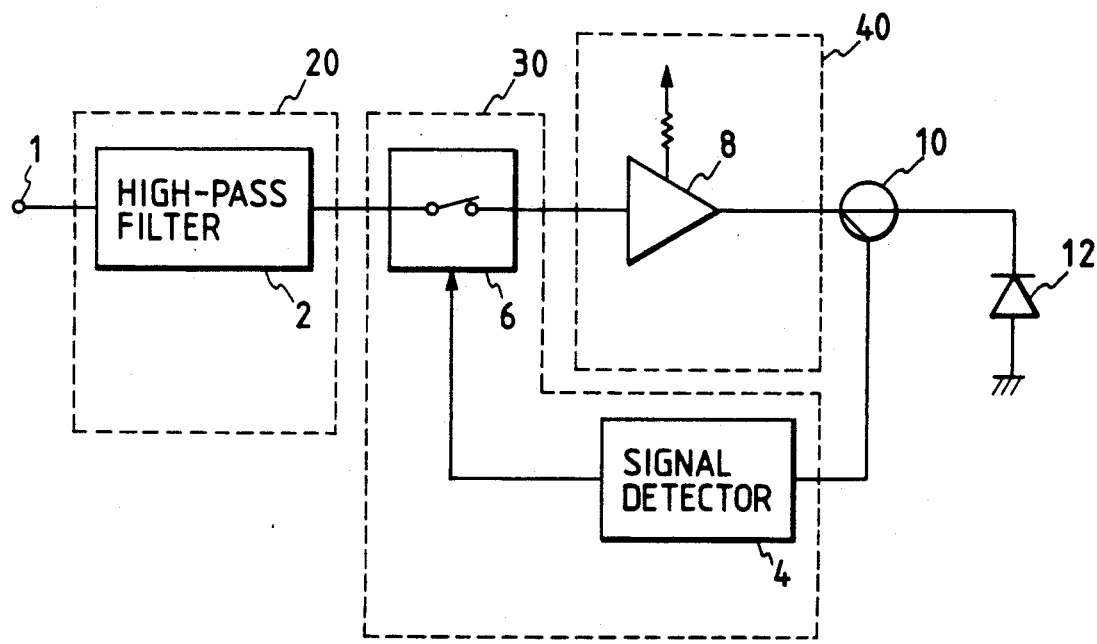
FIG. 1 is a block diagram illustrating a laser diode protective circuit for an optical transmission apparatus according to an embodiment of the present invention.

An embodiment of the present invention will be subsequently described with reference to FIG. 1.

In FIG. 1, an information signal (electric signal) to be transmitted is supplied to a signal input terminal 1. The information signal is supplied to a laser diode 12 in which the signal is converted into a luminous signal through a protective circuit 20 in terms of frequency, a protective circuit 30 in terms of time, a protective circuit 40 in terms of electric power, and power splitter 10.

The protective circuit 20 includes a high-pass filter 2 having a predetermined cut-off frequency. The protective circuit 30 includes a signal detector 4 and a protective switch 6. The signal detector 4 detects when the output signal of the power splitter 10, that is, part of the signal supplied to the laser diode 12 exceeds a predetermined level, and the protective switch 6 is turned off in response to the output signal from the signal detector 4.

The detector 4 has a timer (not shown) for counting a predetermined time, and the protective switch 6 is turned on after the predetermined time passes. The protective circuit 40 includes a laser diode driving amplifier 8 of which the output voltage is adjusted to be lower than the maximum input rating of the laser diode 12.

The operation of the circuits in the embodiment will be subsequently described.

First, in the protective circuit 20 in terms of frequency, the high-pass filter 2 permits passage of only a necessary frequency band of the input signal and cuts off an unnecessary frequency band so as to protect the laser diode 12.

Subsequently, in the protective circuit 30 in terms of time, the signal detector 4 detects part of the signal applied to the laser diode 12 and turns off the protective switch 6 when the signal level exceeds the predetermined level, to protect the laser diode 12 by minimizing the duration of an over-input state.

In the protective circuit 40 in terms of electric power, the output voltage of the laser diode driving amplifier 8 is limited to be lower than the maximum input rating of the laser diode 12 to protect the laser diode 12 by preventing the power greater than the maximum rating from being supplied to the laser diode 12. Further, the protective circuit 40 protects the laser diode 12 with respect to not only the noise due to surge or the like but also the excess input signal unexpectedly supplied by the user.

It is thus made possible to protect the laser diode satisfactorily against requirements for outdoor use without deteriorating the quantity of the transmission signal by adequately combining these three protective conditions.

In addition, although the three protective circuits 20, 30 and 40 are provided in the above embodiment, the combination of at least two of the three circuits can protect the laser diode 12.

According to the present invention as set forth above, it is applicable to optical transmission apparatus for image transmission and optical repeaters in the field of optical CATV with remarkable effects as the laser diode for such an optical transmission apparatus is provided with sufficient protection under the conditions in outdoor use.

What is claimed is:

1. A laser diode protective circuit for an optical transmission apparatus, the optical transmission apparatus having a laser diode which converts an electrical information signal into a luminous signal, said laser diode protective circuit comprising:

filter means, connected between an input terminal of an electrical information signal and a laser diode, for permitting passage of only a predetermined frequency band of the electrical information signal; and interruption means for detecting when a signal having a power level higher than a predetermined power level is supplied to the laser diode and for interrupting the transmission of the signal to the laser diode for a predetermined time period when it is detected that the power level of the signal is higher than the predetermined power level.

2. The laser diode protective circuit according to claim 1, further comprising:

control means for controlling an electric power used to drive the laser diode.

3. A laser diode protective circuit for an optical transmission apparatus, the optical transmission apparatus having a laser diode which converts an electrical information signal into a luminous signal, said laser diode protective circuit comprising:

filter means, connected between an input terminal of an electrical information signal and a laser diode, for permitting passage of only a predetermined frequency band of the electrical information signal; and control means for controlling an electric power used to drive the laser diode.

4. A laser diode protective circuit for an optical transmission apparatus, the optical transmission apparatus having a laser diode which converts an electrical information signal into a luminous signal, said laser diode protective circuit comprising:

interruption means for detecting when a signal having a power level higher than a predetermined power level is supplied to the laser diode and for interrupting the transmission of the signal to the laser diode for a predetermined time period when it is detected that the power level of the signal is higher than the predetermined power level; and control means for controlling an electric power used to drive the laser diode.

5. The laser diode protective circuit according to claim 1, 2, 3 or 4, wherein the filter means includes a high-pass filter.

6. The laser diode protective circuit according to claim 1, 2, 3, or 4, wherein the interruption means includes a signal detector which detects when the signal having the power level higher than the predetermined power level is supplied to the laser diode and a switch which interrupts the transmission of the signal to the laser diode for the predetermined time period.

7. The laser diode protective circuit according to claim 6, wherein the signal detector includes a timer which counts the predetermined time.

8. The laser diode protective circuit according to claim 1, 2, 3, or 4, wherein the control means includes an amplifier which prevents an electric power greater than a maximum rating of the laser diode from being supplied to the laser diode.

9. The laser diode protective circuit according to claim 1, 2, 3, or 4, further comprising a power splitter which supplies part of an output signal from the control means to the interruption means.

* * * * *